Patented Nov. 16, 1937

2,099,132

UNITED STATES PATENT OFFICE 2,099,132

PROCESS OF MAKING CLUTCH FACINGS, BRAKE LININGS, AND LIKE PRODUCTS

Stuart Parmelee Miller, Scarsdale, N. Y., assignor to The Barrett Company, New York, N. Y., a corporation of New Jersey No Drawing. Application March 24, 1936, Serial No. 70,715

1 Claim. (Cl. 91—70)

This invention relates to the production of clutch facings, brake linings and similar articles, of the type commonly formed from asbestos felted or woven fabric or other porous heat-resistant material. It is particularly concerned with the making of asbestos clutch facings impregnated with a bituminous saturant.

In the processes heretofore used for making clutch facings, brake linings, and the like, by the impregnation of porous heat-resistant materials with water gas tar pitch, the bituminous saturant heretofore employed, numerous objectionable features were encountered. Among these are the following:

1. A long period of soaking of the preformed articles in a solution of the pitch saturant maintained at atmospheric pressure and elevated temperature was required. Frequently, soaking for a period of 48 to 72 hours was necessary to obtain satisfactory impregnation.

2. Foaming of the pitch saturant was encountered during saturation with consequent loss of volatile oils from the pitch, and reduction in the amount of pitch absorbed by the clutch facings as the loss of oils caused the saturant to become more viscous and hence less readily absorbed by the facings.

3. Unsatisfactory saturation of the facings was commonly encountered, with respect to both amounts of saturant introduced and the distribution thereof throughout the facing. Owing to uneven distribution of the saturant, fat and lean spots were produced in the product.

4. In order to obtain suitable impregnation, it has been necessary heretofore to employ a saturant of low "free carbon" content, for example, pitch, having a "free carbon" content of 10% or less, preferably around 6%, even though higher "free carbon" saturants would be preferable in the finished product, if thorough impregnation of the facing therewith could be effected. The term "free carbon" is used in the sense common in the coal tar industry to indicate material contained in the bituminous saturant which is insoluble in benzol or carbon disulfide. It is commonly determined as described by Weiss (Journal of Industrial & Engineering Chemistry—vol. 10 (1918) pp. 736–820, Test D5). It comprises high-molecular-weight carbon compounds of low solubility, carbon, and other material insoluble in benzol or carbon disulfide.

It is an object of the invention to avoid the above mentioned difficulties, and to produce impregnated clutch facings, brake linings and like products more uniformly and completely saturated with bituminous or other saturants which, when the saturated product is subjected to elevated temperatures, as in the baking of the saturated products, form coke-like material filling the voids and pores of the articles, so that finished products of improved strength, resistance to heat deterioration and abrasion result. It is a further object to provide a process for producing impregnated asbestos, or other porous heat-resistant facings, which may be more accurately ground and machined to the desired finished size and surface. Another object is to produce saturated clutch facings in which a bituminous saturant of higher "free carbon" content as compared with the free carbon content of pitch heretofore employed may be used to obtain a more durable and satisfactory product. Other objects and advantages of the invention will be evident from the following description.

In accordance with my invention, asbestos facings are impregnated under vacuum with a bituminous saturant such as coal tar pitch or other saturants hereinafter enumerated. By one method, the preformed facings are placed in an impregnation chamber, which is made airtight, and then subjected to vacuum. Bituminous saturant heated to a suitable temperature to effect proper saturation is then added from a storage tank, while the vacuum is maintained on the system. Preferably, the pitch is introduced slowly to the impregnation chamber, whereby air and moisture in the clutch facings are driven off without causing excessive foaming of the saturant. The saturant is introduced until the facings are completely covered therewith. Vacuum is held on the body of saturant in which the clutch facings are immersed long enough to obtain complete saturation, which will normally vary from about 30 minutes to one hour and a half or somewhat longer. After the facings have soaked in the body of saturant maintained under vacuum until the impregnation is complete, the vacuum is broken, thus subjecting the saturant and immersed facings to atmospheric pressure, and the pitch removed from the chamber; the clutch facings may then advantageously be allowed to remain in the tank until excess and surface saturant is drained off. If desired, super-atmospheric pressure, say 25–100 lbs. per square inch or more, may be applied to the impregnatng chamber before the pitch is removed.

As an alternative to the above batch method of effecting saturation, the vacuum saturation may be effected continuously by passing the clutch facings through a body of saturant maintained under vacuum, as, for example, employing the equipment of my United States Patent No. 2,012,969 granted September 3, 1935. For effecting batch saturation of the clutch facings, the equipment of my United States Patent No. 2,012,968 of September 3, 1935 may be employed. Whether a continuous or batch procedure for impregnating the clutch facings is utilized, the vacuum during impregnation is preferably maintained as high as reasonably possible; for example, a vacuum of the order of about 27 to 29 inches of mercury is held on the column of saturant in which the facings are immersed, but this vacuum may be decreased to about 17 inches of mercury with satisfactory results. The higher the vacuum, i. e., the lower the absolute pressure, the more complete and uniform the impregnation will be, although in treating clutch facings, brake bands, etc. with relatively large voids, satisfactory results can be gotten in the relatively lower range.

The saturant is maintained at a temperature below the boiling point of the saturant under the vacuum applied thereto. In general, a saturant is desired that is thinly fluid at 250°–400° F.; the temperature of the saturating material should be maintained at a point where the viscosity of this material is less than 200 seconds, as determined in the Engler viscosimeter for 100 cc. of the saturant. The optimum viscosity of the saturant is from 125 to 150 seconds for 100 cc. at the temperature of saturation. If the temperature is maintained so that the material is more viscous, it will require a longer time to effect satisfactory saturation. In case the saturant employed contains substantial amounts of low boiling constituents, for example, if a coal tar pitch fluxed with a low boiling oil is used as the saturant, a temperature not materially above 250° F. should be maintained in the saturating zone to prevent evaporation of the low boiling oils. Using a hard pitch as the saturant, such as briquette pitch, a temperature of 400° F. may be required to maintain the pitch at proper viscosity. In general, maintenance of the tar or pitch saturant within the range of between 250° to 400° F. will give satisfactory impregnation.

Impregnation of the asbestos clutch facings or other preformed porous articles constituted of fibers or other materials capable of imparting to the finished product the body and strength necessary to resist abrasion and heat deterioration when subjected to conditions of use, as in the case of clutch facings and brake linings, under vacuum as hereinabove described, results in more effective and uniform impregnation of the articles. The saturant introduced under vacuum as hereinabove described penetrates into the interior of the articles and saturates them uniformly throughout the thickness thereof. Moreover, such uniform penetration is obtainable with pitches of free carbon content substantially above that of pitch heretofore in use. Pitches having a "free carbon" content as high as 20% or higher may be used and uniform impregnation throughout the articles obtained.

The saturant employed should be decomposable at elevated temperatures such as the baking temperatures to which the saturated clutch facing is subjected, to produce upon decomposition a semi-coke or other hard material filling the pores and voids in the articles and encasing the fibers so as to produce a dense, hard, product which can be readily machined to result in a finished product highly resistant to heat deterioration and abrasion. For example, a straight distilled coke-oven-tar pitch having a melting point of 187° F. (ring and ball in glycerine) may be employed. Vacuum distilled-coke-oven-tar pitch, and pitches made by fluxing briquette pitch with coal tar to produce pitches having a melting point of from 118° F. to 149° F. (ring and ball in water) may be used. Saturants which in practice have given satisfactory clutch facings are (1) saturant made by mixing about 65% coke oven tar distilled under vacuum to produce a pitch of about 140°–200° F. melting point, preferably about 145° F. with about 35% dehydrated tar; (2) briquette pitch having a melting point of about 187° F. (ring and ball in glycerine); and (3) saturant made by mixing 80% of briquette pitch, having a melting point of about 187° F. (ring and ball in glycerine) with 20% dehydrated coke oven tar to produce a pitch having a melting point of 149° F. (ring and ball in water). In general, a range of saturants having melting points of about 120° F. to about 190° F. has been found the useful range.

After the clutch facings have been impregnated as hereinabove described, and excess saturant drained off, the impregnated facings are slowly baked in an oven by the usual method. The oven is gradually heated to bring the temperature to the desired maximum point, at which it is maintained during the baking, which may require, for example, from two to twelve hours. The baking results in driving off the lighter oils contained in the saturant and in partial decomposition of the residual saturant remaining in the impregnated articles to produce hard, partially coked, material in the pores or voids of the articles. The use of relatively high-free-carbon-containing pitches as the saturant results in the introduction of the free carbon throughout the voids and pores of the facings, and upon decomposition of the hydrocarbon material of the saturant, in a coke-like material filling the pores and voids and encasing the fibers, giving a dense, hard, product which has a metallic ring. The baked facing may be machined to produce a product of the desired size and finish.

There is given below a number of examples of processes of saturating clutch facings in accordance with this invention:

1. In this example the saturant employed was a briquette pitch having a melting point of 187° F. (ring and ball in glycerine). A number of clutch facings were immersed in a bath of this saturant, the temperature of the bath of impregnating material being maintained at 392° F., and a vacuum of 28.5 inches of mercury maintained thereon during the saturation, which required 1½ hours. The impregnated clutch facings contained about 60% fiber and about 40% of the briquette pitch, the pitch being uniformly distributed through the facing, as determined by breaking one of the saturated facings and carefully inspecting the broken sections. After the saturation the impregnated facings were baked for a period of about 6½ hours, while maintaining a temperature sufficient to effect partial coking of the saturant. Generally a temperature of from 500° to 700° F. will be found satisfactory. The baked product was analyzed and found to contain about 72% asbestos fibers and 28% partially coked or baked pitch.

2. In another example a saturant made by mixing 80% briquette pitch having a melting point of 187° F. with 20% of dehydrated coke oven tar was employed as the saturant. A number of facings were immersed for 1¼ hours in a bath of this saturant maintained at a temperature of 356° F. and under a vacuum of 27.5 inches of mercury. The vacuum was then broken and the facings removed. After the impregnation it was found that the facings contained about 60% asbestos fiber and 40% pitch, and were uniformly impregnated throughout. The facings were baked as described hereinabove, and the baked facings analyzed and found to contain 26% pitch and 74% asbestos fiber. In the case of the facings of both examples, a hard, dense, product, having a metallic ring resulted, which products were readily machined to the size and finish desired.

It will be noted that by my method of making clutch facings the products can be completed in about four to fourteen hours or less, as compared with the processing time of about four days as required by heretofore known procedures employed in making clutch facings of similar type. Moreover, pitches having higher free carbon content, as compared with the free carbon content of pitch heretofore employed in impregnating clutch facings, can be employed as the saturant and give uniform and complete impregnation in the practice of the process of this invention. The use of such high free carbon pitches results in a harder, more dense and more readily machinable product, and also permits economies in the manufacture of the product. With any saturant selected, more even and complete penetration is effected and objectionable fat and lean spots heretofore encountered eliminated. The more uniform and complete saturation of the facing not only permits more accurate machining to produce products having a heat and abrasion resistant surface, but also greatly improves the yield of satisfactory finished products.

It will be understood that the invention is not limited to asbestos clutch facings, which are herein particularly described, but that other porous heat-resistant materials for similar uses may be treated and processed in accordance with my invention.

I claim:

A process of making clutch facings, brake linings and like products, from porous heat-resistant material, capable of providing the body and strength necessary to resist abrasion and heat deterioration under conditions to which said products may be subjected in use, which comprises saturating the said porous heat-resistant material under vacuum with a heat decomposable bituminous saturant containing substantially more than 10% free carbon to uniformly impregnate said material and substantially completely fill the pores therein with the free carbon substantially uniformly distributed in said pores, and then baking the impregnated material at a temperature and for a period of time sufficient to cause partial decomposition of the saturant to produce a hard, coke-like, substance filling the pores of said material, whereby a hard, dense, product containing from 26 to 28% by weight of such coke-like substance and resistant to abrasion and heat deterioration results.

STUART PARMELEE MILLER.